United States Patent
Rothman

(10) Patent No.: US 7,831,584 B2
(45) Date of Patent: Nov. 9, 2010

(54) SYSTEM AND METHOD FOR PROVIDING REAL-TIME SEARCH RESULTS ON MERCHANDISE

(75) Inventor: Simon Rothman, Palo Alto, CA (US)

(73) Assignee: Glyde Corporation, Palo Alto, CA (US)

( * ) Notice: Subject to any disclaimer, the term of this patent is extended or adjusted under 35 U.S.C. 154(b) by 285 days.

(21) Appl. No.: 11/963,592

(22) Filed: Dec. 21, 2007

(65) Prior Publication Data

US 2009/0164453 A1 Jun. 25, 2009

(51) Int. Cl.
*G06F 17/30* (2006.01)

(52) U.S. Cl. .................. 707/706; 707/711; 707/715; 707/721; 707/723

(58) Field of Classification Search ............. 707/3–7, 707/10, 104.1, 706, 711, 721, 723
See application file for complete search history.

(56) References Cited

U.S. PATENT DOCUMENTS

| | | | |
|---|---|---|---|
| 6,490,567 B1 | 12/2002 | Gregory | |
| 6,564,213 B1 | 5/2003 | Ortega et al. | |
| 6,839,690 B1 | 1/2005 | Forth et al. | |
| 6,851,604 B2 | 2/2005 | Girotto et al. | |
| 7,111,252 B1 | 9/2006 | Harris | |
| 7,155,663 B2 | 12/2006 | Landsman et al. | |
| 7,197,475 B1 | 3/2007 | Lorenzen et al. | |
| 7,254,774 B2 | 8/2007 | Cucerzan et al. | |
| 7,266,513 B2 | 9/2007 | Chalmers et al. | |
| 7,447,678 B2 * | 11/2008 | Taylor et al. | 707/3 |
| 7,610,233 B1 * | 10/2009 | Leong et al. | 705/37 |
| 2001/0054008 A1 | 12/2001 | Miller et al. | |
| 2002/0002527 A1 | 1/2002 | Holtzman | |
| 2002/0032668 A1 | 3/2002 | Kohler et al. | |
| 2002/0107820 A1 | 8/2002 | Huxter | |
| 2002/0107861 A1 | 8/2002 | Clendinning et al. | |
| 2002/0113815 A1 | 8/2002 | DeGross | |
| 2003/0020758 A1 | 1/2003 | Hinderks | |
| 2003/0023499 A1 | 1/2003 | Das et al. | |
| 2003/0200156 A1 | 10/2003 | Roseman et al. | |
| 2005/0004889 A1 * | 1/2005 | Bailey et al. | 707/1 |
| 2005/0071249 A1 | 3/2005 | Nix et al. | |
| 2005/0102202 A1 * | 5/2005 | Linden et al. | 705/27 |
| 2005/0144052 A1 | 6/2005 | Harding et al. | |
| 2007/0208635 A1 | 9/2007 | Van Luchene et al. | |
| 2008/0040323 A1 * | 2/2008 | Joshi | 707/3 |
| 2009/0276522 A1 * | 11/2009 | Seidel | 709/224 |
| 2010/0023311 A1 * | 1/2010 | Subrahmanian et al. | 704/2 |

* cited by examiner

*Primary Examiner*—Don Wong
*Assistant Examiner*—Hanh B Thai
(74) *Attorney, Agent, or Firm*—Townsend and Townsend and Crew LLP

(57) ABSTRACT

A search suggestion system and method for a product/service database which provides an improved, bifurcated search result search result algorithm. A vectored index of a product/service database is first generated. As a search query is typed, the letters/words are processed through a lexographical matching module, compared to the index, and a subset of the index is identified. The subset is then ranked according to (1) the user's history, (2) most popular sales data, (3) most often viewed products, and (4) lexographical weights. The highest ranked items are then displayed in a drop-down list to the user.

22 Claims, 4 Drawing Sheets

SYSTEM AND METHOD FOR PROVIDING REAL-TIME SEARCH RESULTS ON MERCHANDISE

CROSS-REFERENCES TO RELATED APPLICATIONS

Related applications are Ser. No. 11/963,675, "Virtual Shelf with Single Product Choice and Automatic Multiple Vendor Selection"; Ser. No. 11/963,382, entitled "System and Method for Dynamic Product Pricing"; Ser. No. 11/963,711, entitled "Software System for Decentralizing eCommerce with Single Page Buy"; Ser. No. 11/963,718, entitled "3D Product Display on Internet with Content or Transaction Data on Back of Image"; Ser. No. 11/963,470, entitled "Product Distribution System and Method Thereof"; and Ser. No. 11/963,601, entitled "System and Method for Integrated Payment and Shipping Information,"; all filed even date herewith.

BACKGROUND OF THE INVENTION

This application relates to real-time search result suggestions.

Google developed an application called "Google Suggest." Other web sites, such as Ask.com, Yahoo.com and Kayak.com, offer similar features. After a few letters of a search query are typed in, a drop down list of possible search terms appears. In addition, spelling corrections are suggested. The suggestions are typically based on the most popular search terms having the same word(s) or combination of letters.

Examples of patents relating to search queries include Microsoft U.S. Pat. No. 7,254,774 provides a mechanism provides search suggestion based on spelling and search query logs. As another example, Amazon.com, Inc. U.S. Pat. No. 6,564,213 provides an auto completion mechanism for search strings using a dynamically updated database, which is based on popularity of database items.

BRIEF SUMMARY OF THE INVENTION

The present invention applies a real-time search result suggestion system and method to a product/service database, and provides an improved, bifurcated search result results algorithm. A vectored index of a product/service database is first generated. As a search query is typed, the letters/words are processed through a lexographical matching module, compared to the index, and a subset of the index is identified. The subset is then ranked according to a ranking database which includes (1) the user's history, (2) most popular sales data, (3) most often viewed product data, and (4) lexographical weight. The highest ranked items, which are search results, are then displayed in a drop-down list to the user.

In one embodiment, the ranking database includes both offline and online sales data. The sales data is grouped and weighted bases on sales to the user, sales to all users, sales on the website being searched, and sales on other websites. The algorithm is adaptive. For example, a users own purchases normally have a higher weighting. However, for a new user with little purchase history, the sales to others are given a higher weighting (products actually bought). The sales to others includes sales to all others, and sales to others with a similar profile to the user. The similar profile sales are normally weighted higher, except where there is insufficient profile data, in which case the data from all others is considered more likely to be more accurate.

The search data is handled similarly, with a user's own previous searches being weighted higher, except for a user with little search history, or little search history relating to the letters being typed in. Again, searches done by all others and searches done by others with similar profiles are weighted similarly to the sales data. In addition to previous searches, other user data is considered, such as items viewed, ratings the user has given to products, genres the user has expressed an interest in, catalogs the user has stored, etc.

By tailoring searches to products/services, and not to all information in general, new challenges and opportunities are presented. Embodiments of the present invention modify standard search algorithms to take advantage of that specialization.

DETAILED DESCRIPTION OF THE INVENTION

User Interface

Figure 1:
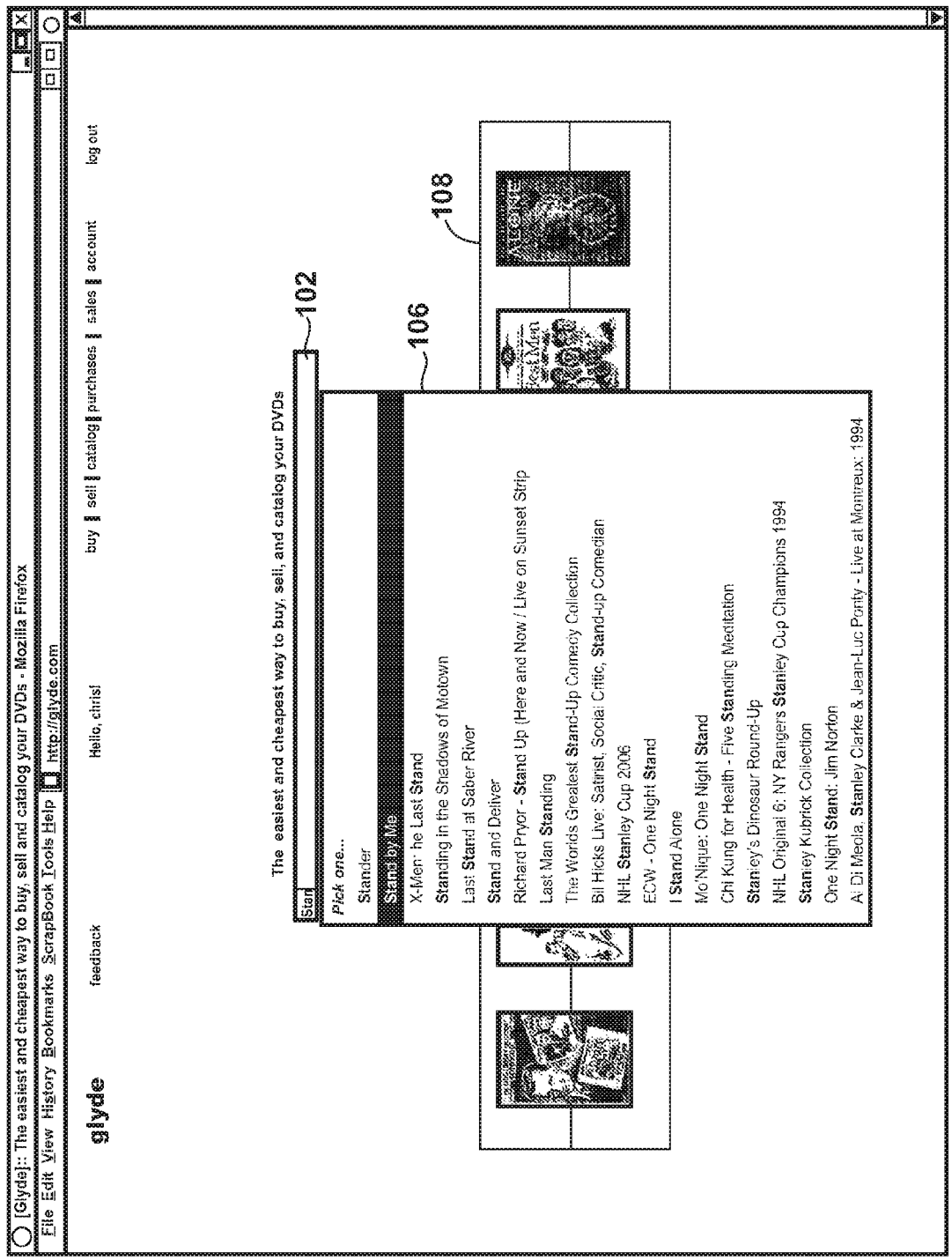
FIG. 1 is a diagram of a user interface for search results suggestion according to one embodiment of the invention.

FIG. 1 is a diagram of a user interface for search results suggestion according to one embodiment of the invention. The interface, prior to any user input, includes a text input box 102 (note there is no search click button as in prior art systems). As an end user enters a search query, a dropdown list 106 appears. The dropdown list includes real-time search results. The letters or words typed by the user are highlighted. Although the list would typically be arranged in order of which products are the best match, it could be arranged in other ways, such as in alphabetical order.

Figure 2:
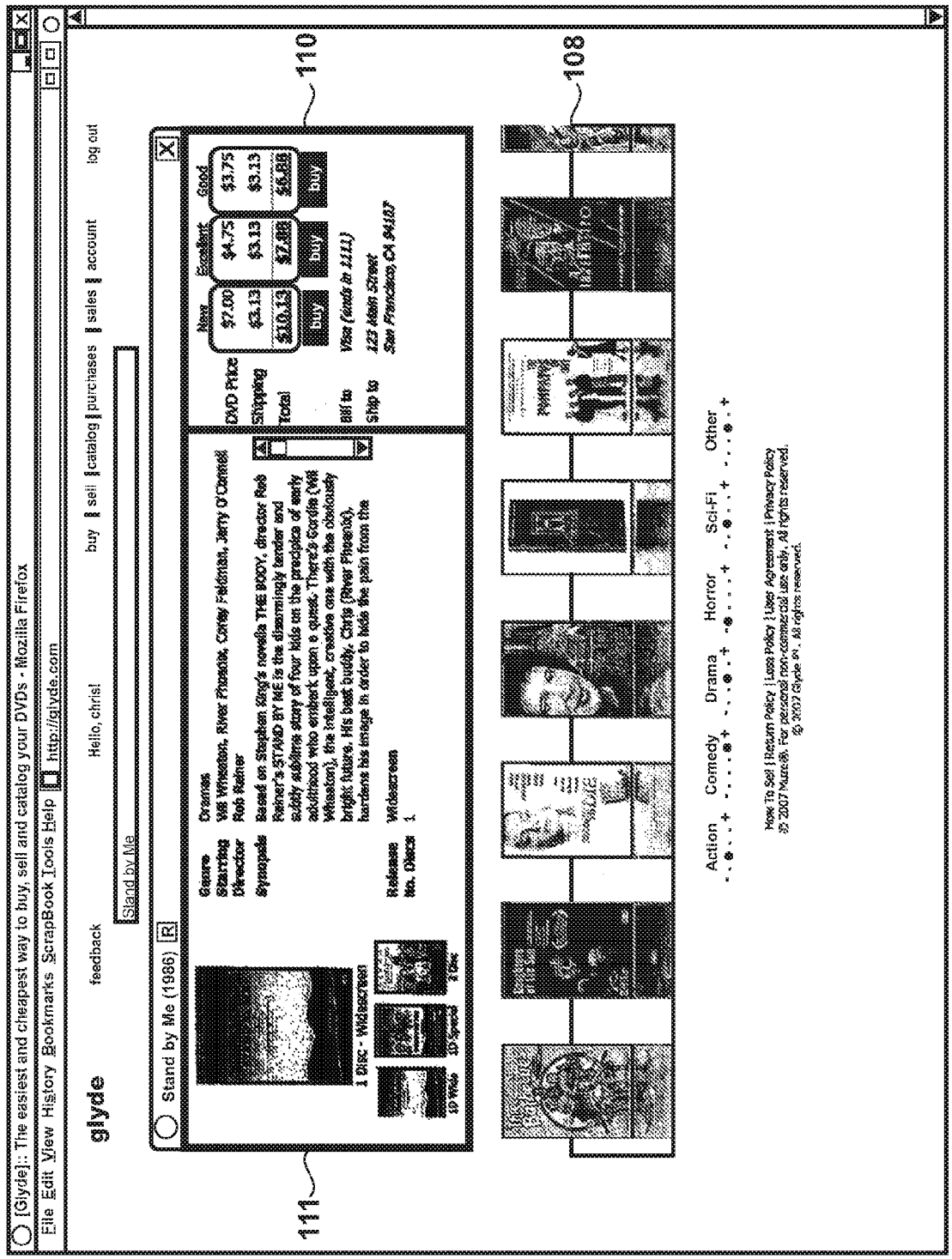
FIG. 2 is a diagram of the user interface of FIG. 1 after a user clicks on a results suggestion according to one embodiment of the invention.

The user can select an item from the drop down list by moving the cursor to highlight it and clicking or pressing enter. Alternately, a separate click button could be provided. Once the user clicks, a window 110 is brought up, as shown in FIG. 2, displaying the product along with information allowing the user to buy. In particular, for a multi-seller website, the system determines that at least one seller is available, based on factors including a sufficient reliability rating and/or location that minimizes shipping costs. The product is then displayed with the total costs, allowing a single page buy, as described in detail in copending application Ser. No. 11/963,675, "Virtual Shelf with Single Product Choice and Automatic Multiple Vendor Selection", which is hereby incorporated herein by reference.

A window 108 provides a scrolling display of images of products. The products displayed can be tailored to fit the products the user is likely to want to purchase. The details of such a display are also set forth in co-pending "Virtual Shelf" application referenced above. In one embodiment, the particular products listed can be changed and/or updated based on the search terms being typed in. Thus, not only is there a drop down list showing the DVD titles (e.g., Predator 2, Alien vs. Predator, Predators at War, etc.), images of those DVDs are also displayed in a scrolling window. For example, the scrolling window 108 may be used for this purpose. Although it may take more time for the calculations to display images in this window, compared to the drop down list, the nature of the scrolling display makes this unnoticeable to the user. After the calculation is done, the image doesn't appear instantly, it scrolls onto the display from the right or left side. In one embodiment, the image may be changed even after it has partially appeared from the right or left. Alternately, window 108 may display similar, but different, products, thus expanding the number of options presented to the user. Thus the user has some options which are textual (drop down window 106), and others with images (scrolling window 108).

It is to be appreciated that the dropdown list 106 displays search results in real-time based on the search query, partial or full, from the user. By selecting a search result from the dropdown list 106, the user is directed to a specific link and/or products (e.g., the product as shown in the window 108). In contrast, in conventional techniques, such as the Google Suggest, merely provides search results suggestions, and by click of which the user is directed to search results, not the specific links and/or products. As a result, conventional techniques requires user to perform extra (or intermediate) steps during search processes.

In the embodiment shown in FIG. 1, the drop down list 106 extends over window 108. Alternately, window 108 may be positioned where it is still completely viewable, such as by putting it lower on the page, using a shorter drop down list, having superimposed, faded images, etc. Thus, not only can the user click on the word, the user can click on an image in window 108. Both produce the same result of displaying window 110 as shown in FIG. 2.

Overall System

Figure 3:
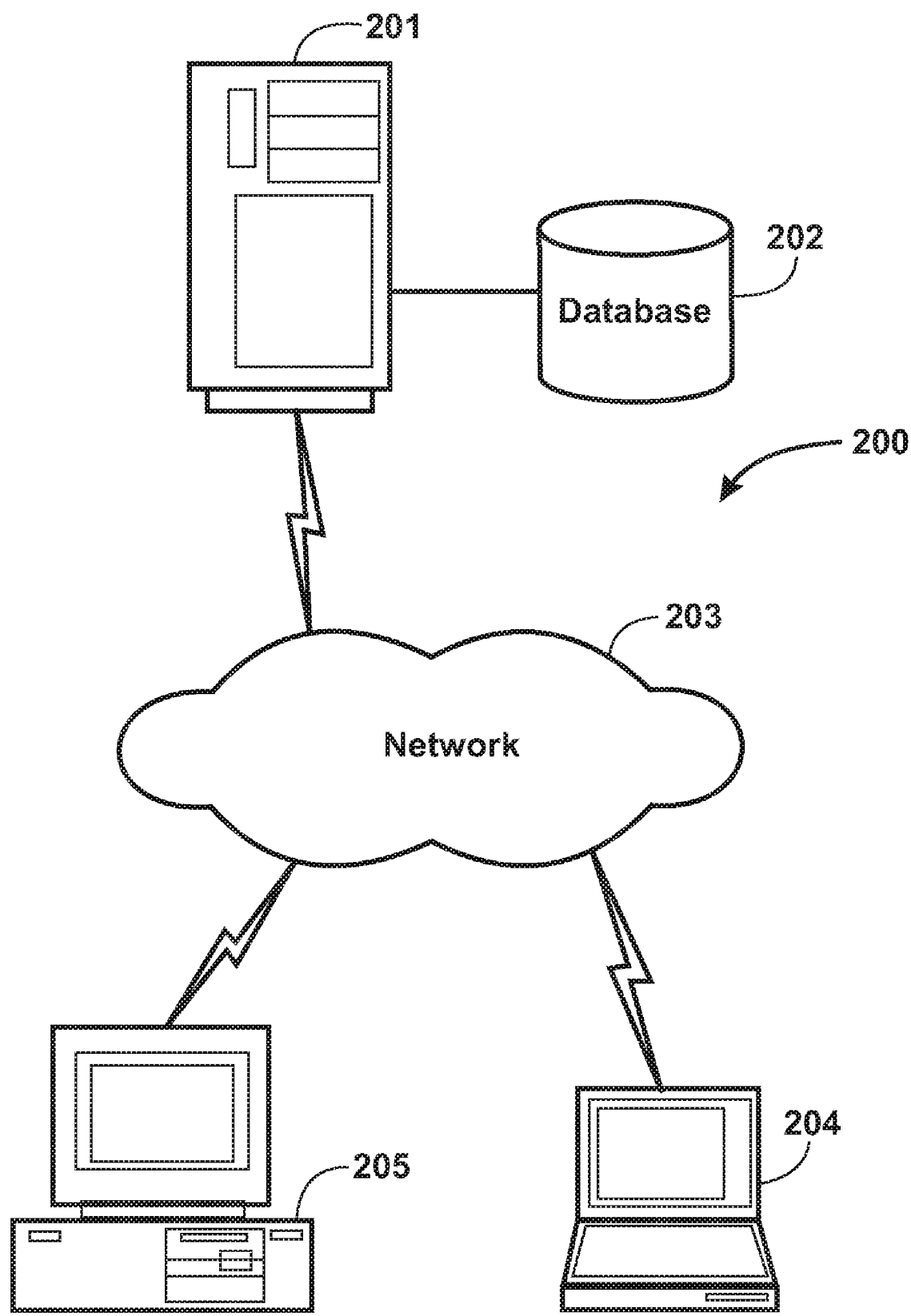
FIG. 3 is a simplified diagram illustrating a system for providing search results suggestions according to an embodiment of the present invention.

FIG. 3 is a simplified diagram illustrating a system for providing search results according to an embodiment of the present invention. A server 201 is configured to perform search operations based on search queries received from users entered through the user terminals 204, 205.

A database 202 is accessed by server 201. The database stores, among other things, products and services available for sale, rent, barter, etc., along with a vectored index. The database also stores (1) the user's history, (2) most popular sales data, and (3) most often viewed product data. In one embodiment, the database 202 is integrated with the server 201. As another example, the database 202 includes multiple storage devices that are linked to one another.

The network 203 provides a communication gateway between the server and the user terminals. For example, the network 203 is the Internet. A secured connection may be established between the network 203 and the user terminals. For example, the user terminal is used to provide a user interface and network connectivity. Depending on the application, the user terminals may be a personal computer, a mobile phone, a personal digital assistant, and others.

During a search process, a partially completed search query is entered through the user interface at one or the user terminals. The search query is sent to the server 201 through the network 203. The server 201 determines what search results to suggest based on the partially completed search query, the user profile, search pattern, search query rank, and other factors as well. Depending on the application, the search results suggestion may be determined by a remote network server or a local computer.

Search Result Suggestion Algorithm

Figure 4:
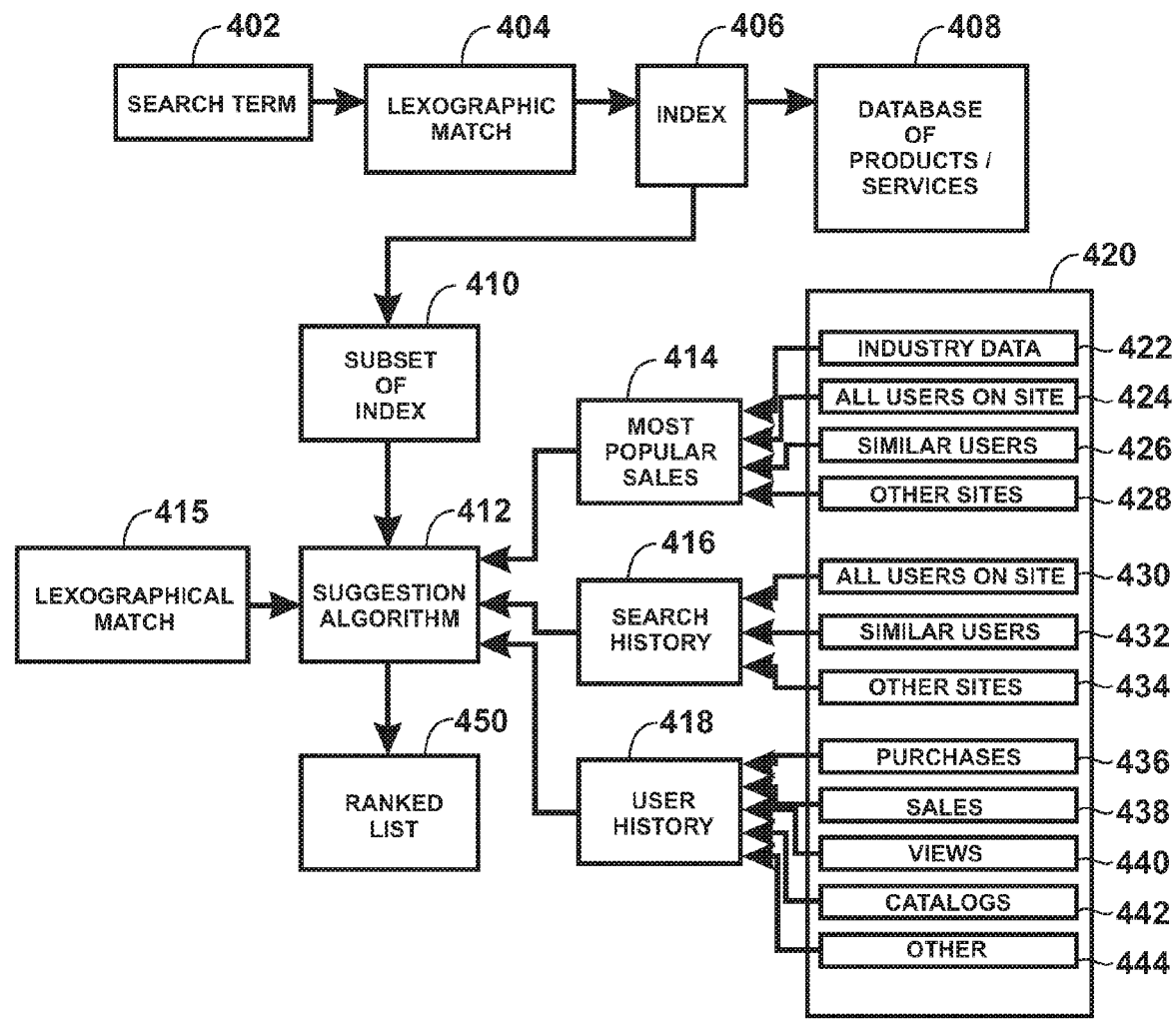
FIG. 4 is a simplified flow diagram illustrating a process for search results suggestion according to an embodiment of the present invention.

FIG. 4 is a simplified flow diagram illustrating a process for search results according to an embodiment of the present invention. A partial search term 402 is entered by a user. The partial search term is provided to a lexography module 404, which compares it to possible matches in a vectored index 406 of a database 408 of products/services for sale. A subset of results 410 from the index is identified. According to various embodiments, the index is prepared based on a variety of factors. For example, one portion of the index is specifically prepared for movie titles. Depending on the specific application, many types of indices may be used. For example, for selling media-type merchandises, indices may be organized based on a DVD title, name of director, names of actors, studio name, names of screen writers, genre, release date, language, etc.

In a specific embodiment, the lexographical module 404 is configured to assign rank the partial matches. The ranking process can be based on a variety of factors, such as the matching location (e.g., does the partial query match beginning or middle of a term?), matching category (e.g., title, genre, etc.), and others.

The subset of names 410 is then provided to a search result algorithm module 412 which compares them to product names with the most sales from most popular sales module 414, the most searched products from search history module 416, matches from the lexographical match module 419, and products identified using a user history module 418. These modules in turn draw their information from a database 420. As an example, the lexographical match module 419 is a separate module from the lexgraphical module 404, where the module 404 provides a preliminary search suggestions and the module 419 is utilized by the search result algorithm module 412 to provide a ranked list that is to be displayed.

Database 420 stores a variety of data which is supplied to modules 414, 416, 418, and 419. Offline industry data 422 is stored and provided to module 414. This shows what products and services have sold in various types of stores, such as the traditional brick and mortar stores, local rentals, etc. In addition, online sales 424 from the same website by all users is stored. In one embodiment, the website is a multi-seller website. In a specific embodiment, industry data includes an aggregate sales data for all types of sales and rental activities, both online and offline. Data 426 reflects sales from users with similar profiles. Also, online sales data 428 across all sites is stored. This data is obtained through arrangements with operators of other websites. In one embodiment, only sites offering products or services are used, not sites providing information such as news. Alternately, such other sites can be used, and can be ranked according to relevance. For example, a site with product reviews would have a higher weighting than a web blog that may happen to mention products once in a while.

Search history module 416 draws data based on the popularity of products used by users on the same site, all search terms 432 by users with similar profiles and all search terms 434 on other sites.

User history module 418 draws data from purchases 436 by the user, sales 438 of products by the user to other buyers, product views 440, catalogs or wish lists 442 and other items 444 (such as product ratings the user input, genre preferences, etc.). The purchases 436 are preferably used to generate a list of similar products, which is what is actually provided to user history module 418. This list is calculated and stored before the user initiates a search, so that it is instantly available. It is updated each time the user makes a purchase, so the updated list of similar items is then available for future searches. Similarly, the other data categorized are compiled, stored, and available prior to the user entering the search terms. The particular user doing the search is identified by logging in, and/or from a cookie on the user's computer.

The data used by each module 414, 416 418, and 419 is weighted, and the results from each of these three modules are themselves weighted by search result algorithm 412 to come up with a ranked list 450 which is provided in drop down window 106 of FIG. 1. The algorithm is adaptive. For example, a users own purchases normally have a higher weighting. However, for a new user with little purchase history, the sales to others are given a higher weighting (products actually bought). In one embodiment, the data is weighted as follows, with W1 being the highest weighting, W2, W3, and W4 being successively lower weightings:

W1 (user history)+W2 (most popular sales)+W3 (search history)+W4 (lexographical weight)

Within each category, additional weights are applied. For example, for most popular sales the weighting may be:

W1 (similar user purchases 426)+W2 (all purchases on the site 424)+W3 (other sites purchases 428)+W4 (industry data 422).

Note, however, that the weightings can dynamically change. For example, if the site is new, without much sales history, industry data or other sites purchases will be weighted higher.

Each time a new letter is typed in by the user, the algorithm updates the search result list. For each new letter, the whole of index 406 need not be searched again, but rather subset 410, generating a further subset. Each time a new letter is added, a new subset is identified, narrowing the choices that are applied to the search result algorithm. The narrowed subset then causes a re-ranking of results provided the first time through by modules 414, 416, 418, and 419. Since the first letter or letters do not normally change, the previously obtained product names continues to be the superset of relevant products. In one embodiment, 100 product names may be obtained from each of modules 414, 416, 418, and 419 in response to the first letter, and then cached. These results are simply filtered with each additional letter. In one alternate embodiment, a completely new search can be done in parallel and compared to see if new products are identified. The parallel results could be run after the second letter is typed, but not compared and used until the 4th letter is typed to avoid slowing down the presentation of the list.

In one embodiment, the transaction history of a user includes the merchandise that the user in the past has bought, sold, rented, and/or traded. In addition, the user profile may also include other user preferences, supplied by the user or other parties. For example, the user preference includes the merchandises that the user owns, user ratings, genre selections, and others. In a specific embodiment, the user transaction history also includes information related to the genre, year, artists, and/or other information for media products, such as movies, music, books, etc. It is understood that the embodiments of the present invention can be applied to facilitate the sales of other types of products, which includes toys, electronics, clothing, books, jewelry, etc. In addition, transactions can include sales, rental, barter, and others. According to an embodiment, the user profile includes the user's previous search history and/or click stream associated with specific types of merchandises.

A user pattern is determined from the user transaction history. For example, the user may prefer action movies, rock and roll music, thriller novels and electronic gadgets. In certain embodiments, the user pattern is determined based on the transactional histories and preferences of other users who are "similar" to the user. For example, these users, based on their respective transactional history, may have similar user preferences, or have viewed and/or performed transaction on similar merchandises.

It is also understood that the examples and embodiments described herein are for illustrative purposes only and that various modifications or changes in light thereof will be suggested to persons skilled in the art and are to be included within the spirit and purview of this application. In one embodiment, the search algorithm is performed on a multi-seller website. Alternately, it may be a single seller website. Or, the search box could be in a banner add box on an unrelated website, with a connection being opened to the main website when letters are typed in.

What is claimed is:

1. A method for providing search result suggestions, comprising:
   providing an index to a product/service database;
   detecting an entered partial search query from a user;
   lexographically matching said partial search query to said index;
   identifying a matching subset of said index;
   ranking products/services in said subset according to a ranking database which includes (a) said user's history, (b) most popular sales data, (c) most often viewed products, and (d) lexographical weights to produce a highest ranked list of search results; and
   displaying said highest ranked list of search results.

2. The method of claim 1 wherein said (a), (b), (c), and (d) categories of said ranking database are adaptively weighted.

3. The method of claim 2 wherein an adaptive weighting is reduced where the amount of data in one of said categories is less than a threshold amount.

4. The method of claim 1 wherein said (c) most often viewed products comprises search data on websites that sell products or services.

5. The method of claim 1 wherein (b) most popular sales data comprises:
   purchases by similar users to said user;
   all purchases on a website corresponding to said product/service database;
   purchases on other sites; and
   offline industry data.

6. The method of claim 1 further comprising accessing a target link upon receiving a selection on one of the search results.

7. The method of claim 1 wherein said (a) user's history comprises a recent viewing history.

8. The method of claim 1 wherein said (a) user's history comprises a recent search history.

9. The method of claim 1 wherein the ranking database further includes (e) histories of similar users to said user, and (f) most often viewed product data by the similar users.

10. A system for providing search result suggestions, the system comprising:
    a processor;
    a product/service database, the database being configured to store product/service information for products/services being offered for sale on a multi-vendor website;
    a communication interface, the communication interface being configured to receive one or more user inputs;
    a computer-readable medium for storing program instructions, said instructions including:
      code for providing an index to said product/service database;
      code for detecting an entered partial search query from a user;
      code for lexographically matching said partial search query to said index;
      code for identifying a matching subset of said index, wherein said subset includes products/services that are being offered for sale on said multi-vendor website that also lexographically match said partial search query;

code for ranking products/services in said subset according to a ranking database which includes (a) said user's history, (b) most popular sales data, (c) most often viewed products, and (d) lexographical weights to produce a highest ranked list of search results;

code for displaying said highest ranked list of search results;

code for receiving a selection of a result from the list of search results; and code for displaying the product/service corresponding to said selection on said multi-vendor website.

11. A method for identifying a product for sale on a multi-vendor website, comprising:

providing an index to a products database, the index including a listing of products for sale on the multi-vendor website;

receiving a partial search query from a user, said partial search query partially identifying the product;

lexographically matching said partial search query to said index to create a subset of said index, said subset including products in said index that match said partial search query;

ranking products in said subset according to a ranking database which includes lexographical weights, and at least two of (a) said user's history, (b) most popular sales data, and (c) most often viewed products, to produce a ranked list of product results; and displaying said ranked list of product results, wherein each product is said ranked list is offered for sale on said multi-vendor website.

12. The method of claim 11, further comprising:

receiving, from the user, additional input to the partial search query, wherein said additional input further defines said partial search query;

lexographically matching said further defined partial search query with said subset of said index to form a narrowed subset of said index;

performing said step of ranking with said narrowed subset; and displaying said ranked list.

13. The method of claim 12, further comprising:

receiving, from the user, a selection of a product in said ranked product list; and displaying to the user a page wherein said selected product can be purchased on said multi vendor website.

14. The method of claim 12, further comprising:

reiterating said steps of receiving additional input, lexographically matching, ranking, and displaying until the user selects a product from said ranked list.

15. The method of claim 11, wherein ranking by most popular sales data further includes ranking by:
1) similar user purchases;
2) all purchases on the multi-vendor website;
3) purchases on other websites; and
4) industry data.

16. The method of claim 2 wherein the user's history is given the highest weight.

17. The method of claim 2 wherein if there is insufficient user's history, the most popular sales data is given the highest weight.

18. The method of claim 2 wherein said ranking is reproduced as additional input is provided in the partial search query using said adaptive weighting.

19. The method of claim 17 wherein the most popular sales data comprises purchases made by similar users and said purchases made by similar users is given the highest weight.

20. The method of claim 2 wherein the most often viewed products is given the highest weight.

21. The method of claim 12, further comprising:

receiving, from the user, a selection of a product in said ranked product list; and displaying to the user a page wherein said selected product can be listed for sale on said multi vendor website.

22. A method for identifying a product for sale on a multi-vendor website, comprising:

providing an index to a products database, the index including a listing of products for sale on the multi-vendor website;

receiving a character of a search query, said character partially identifying the product;

lexographically matching said search query to said index to create a subset of said index, said subset including products in said index that match said search query; and repeating the following steps until the product is identified:

ranking products in said subset according to a ranking database which includes lexographical weights, and at least two of (a) said user's history, (b) most popular sales data, and (c) most often viewed products, to produce a ranked list of product results;

displaying said ranked list of product results, wherein each product in said ranked list is offered for sale on said multi-vendor website, wherein the product may be identified from the ranked list; and if the product is not identified from the ranked list, receiving a next character of said search query and eliminating products in said subset which do not lexographically match said search query.

* * * * *